United States Patent [19]

Hammon et al.

[11] 4,037,259
[45] July 19, 1977

[54] METHOD AND EQUIPMENT FOR SWITCHING THE OPERATING CONDITIONS OF A TAPE-RECORDER

[75] Inventors: Fritz Hammon; Georg Schnell; Karl-Juergen Reimer, all of Ludwigshafen, Germany

[73] Assignee: BASF Aktiengesellschaft, Ludwigshafen, Germany

[21] Appl. No.: 619,232

[22] Filed: Oct. 3, 1975

Related U.S. Application Data

[63] Continuation-in-part of Ser. No. 382,344, July 25, 1973, abandoned.

[30] Foreign Application Priority Data

July 26, 1972 Germany .............................. 2236593

[51] Int. Cl.$^2$ ............................................. G11B 5/47
[52] U.S. Cl. ...................................... 360/66; 360/69
[58] Field of Search ...................... 360/69, 74, 65, 66, 360/71

[56] References Cited

U.S. PATENT DOCUMENTS

| | | | |
|---|---|---|---|
| 3,434,725 | 3/1969 | Eibensteiner | 360/74 |
| 3,583,617 | 6/1971 | Kosaka | 360/74 |
| 3,588,380 | 6/1971 | Horlander et al. | 360/66 |
| 3,694,585 | 9/1972 | Goldner | 360/74 |
| 3,800,316 | 3/1974 | Kumarchuk | 360/74 |

Primary Examiner—Robert S. Tupper
Attorney, Agent, or Firm—Keil, Thompson & Shurtleff

[57] ABSTRACT

This invention concerns methods and devices for switching a tape-recorder or cassette tape-recorder and especially recorders on which tapes with different magnetic coatings can be used. According to the invention, at least one section along the magnetic tape which has a much higher electric resistance than the magnetic coating is used in conjunction with arrangements of simple layout and in advantageous manner to monitor the resistance of the tape either continuously or sporadically, and at least one predetermined switching state of the recorder is allocated to each different resistance value. This ensures reliable switching of any such states as "machine on", "machine off" or "iron oxide (chromium dioxide) tape" bias, without any other special changes at the magnetic tape or at the cassette.

8 Claims, 6 Drawing Figures

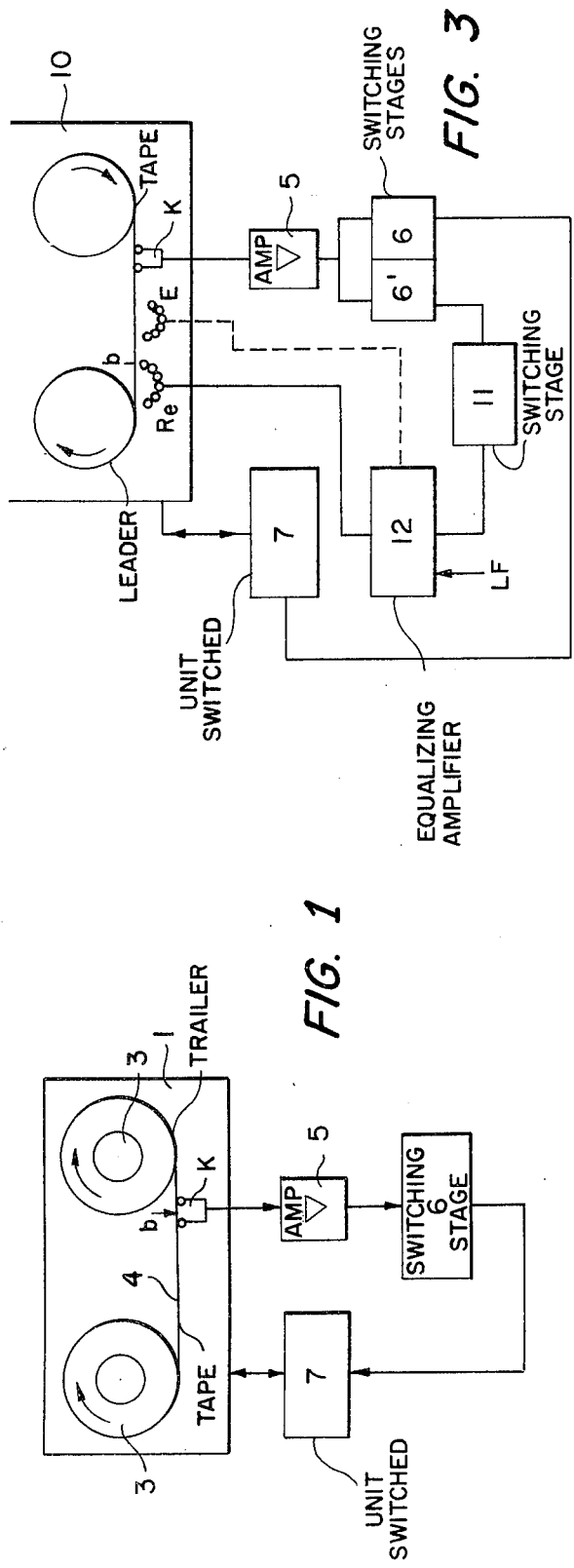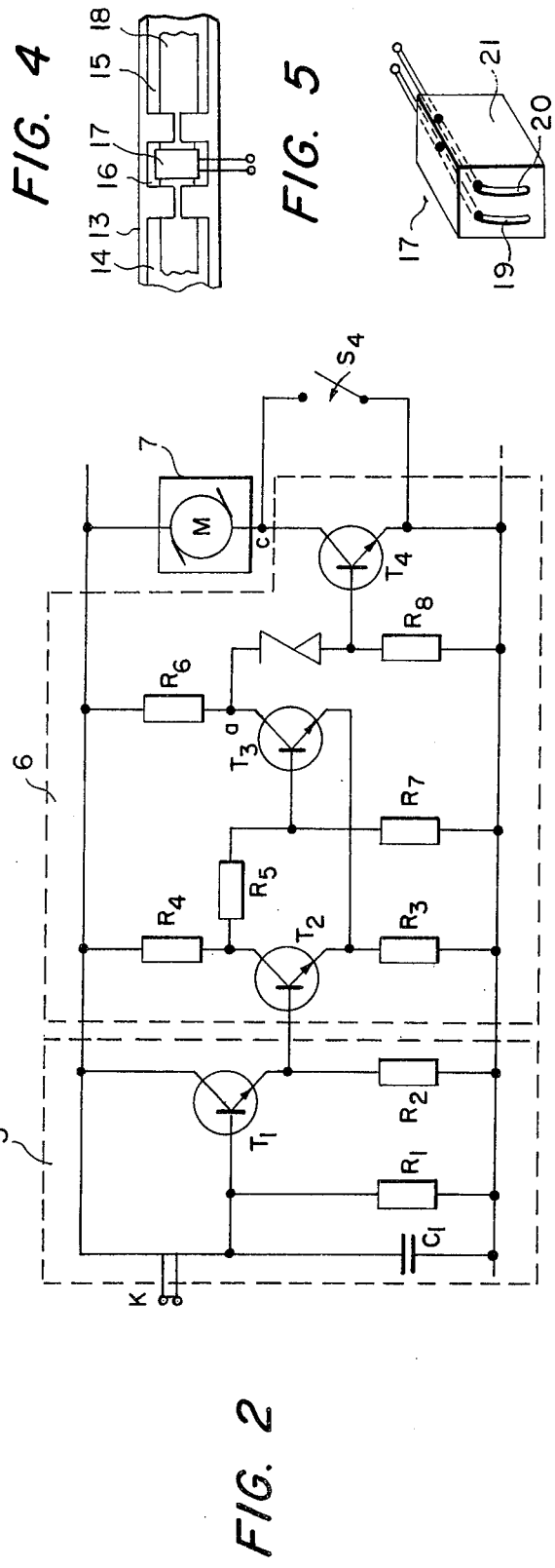

METHOD AND EQUIPMENT FOR SWITCHING THE OPERATING CONDITIONS OF A TAPE-RECORDER

This is a continuation-in-part of application Ser. No. 382,344, filed July 25, 1973 and now abandoned.

BACKGROUND OF THE INVENTION

1. Field of the Invention

This invention concerns methods and equipment for switching a tape-recorder which operates with magnetic tape to be wound on a reel and, at the same time, drawn off the same or off another reel, the magnetic tape being attachable to the reel or reels and the tape surface being scanned to effect the switching operation.

The invention also concerns methods and equipment for switching a tape-recorder capable of operating with tape coated with different types of magnetic layer which may be provided with a leader and/or a trailer, at least one switching state of the recorder being achievable by continuous or sporadic scanning of the tape surface.

2. The Prior Art

A device for triggering a signal for controlling the drive mechanism of a tape-recorder is known, especially for disconnection when the tape end is reached. In this known arrangement, a reproduction head cooperating with a special recording on the tape, at least one amplifier stage, a demodulator and a fixed-threshold amplitude comparator stage (the threshold must be higher than the noise voltage of the amplifier stages and lower than the noise voltage of the magnetic tape) are needed to produce the control signal when the scanned level falls below the threshold level. This arrangement relies on the condition that the noise signal at the reproduction amplifier output drops by 10 to 12 dB when the leader tape is scanned. By selectively limiting the frequency band of the output voltage of the reproduction amplifier, the control signal is to be triggered after amplification, amplitude limitation, demodulation and amplitude comparison.

In view of the multitude of additional stages all of which have to be matched comparatively accurately, the known methods and the equipment necessary to carry them out are hardly justifiable economically.

In particular, with recordings on low-noise tape extremely low noise voltages at the reproduction amplifier output are required if the ratio to the tape noise voltage required for the safe functioning of the arrangement (10 to 12 dB) is to be preserved.

According to the German Industrial Standard DIN 45512, leaders used for magnetic tape of 6.3 mm width consist of a coloured tape of synthetic material 1 m long and a highly conductive switching section of 15 cm length on which the resistance of the conductive layer is equal to or less than 2.5 ohms, the switching section being spliced to the magnetic tape. As the end of the magnetic tape travels past, an electric circuit is closed by means of the switching section and two contacts touching the tape, and the tape-recorder is switched off by means of relays or other switching devices, so that the end portion of the tape cannot run off and the user is obliged to re-thread the tape prior to re-winding. The particular disadvantage of this type of leader or trailer for the purpose of tape end switching is the additional expense in manufacture.

In the case of tapes for small cassette recorders, no special switching sections or adhesive reflector markers etc. are used for economy reasons. Here, the leader merely consists of a non-coated transparent synthetic tape of great strength which is attached to the reel core (see, for example, DIN 45 516). This kind of synthetic tape has so far not been used for switching purposes, except optically.

Other arrangements for switching tape or cassette recorders monitor the tape tension, the centrifugal force or the rotation of the take-up spindle to produce a control signal. According to another known method, switching operations are triggered by the photoelectric scanning of holes punched, or transparent tape sections inserted, in the magnetic tape.

Another tape-recorder switching device is known in the case of which the ferro-magnetic surface of the tape-like recording medium is scanned to trigger a switching operation. Here, the tape is rendered less conductive or completely insulating at its ends. During scanning, the resistance of the recording medium is continuously monitored and a definite state is allocated to each of the two different resistance values: the state "machine operative" is allocated to the highly conductive surface (resistance a few ohms) of the recording medium, and the state "machine stops" is allocated to the less conductive surface (resistance virtually infinite at the ends of the recording medium). This known arrangement can only be employed for the on/off switching of the tape recorder.

However, all the above-described arrangements are technically complex without exception, and accurate switching operations cannot be controlled with sufficient reliability.

Also known are tape recorders on which tape coated with different types of magnetic layer can be used. Such magnetic tapes are, for example iron oxide tapes ($Fe_2O_3$), chromium dioxide tapes ($CrO_2$) and metal pigment tapes.

$CrO_2$ tapes and metal pigment tapes are characterized by a remanent flux higher than in comparable $Fe_2O_3$ tapes and also by a more favorable remanent flux/sound or other wavelength characteristic, especially in the low wavelength spectrum. In order to derive the full benefits from $CrO_2$ tapes, the tape-recorder has to be adapted to the improved magnetic properties of these tapes by switching the recorder electronics prior to using $CrO_2$ tapes. Thus, in view of the higher coercivity of the $CrO_2$ tapes, an HF magnetising current and an erasing current must be set which is higher than in the case of $Fe_2O_3$ tapes, in order to achieve optimum recording and erasion. The favorable tape flux characteristic of low wavelengths makes it possible to work with less highly raised high-frequency signal amplitudes in the reproduction amplifier, and this has a beneficial effect on the signal-to-noise ratio of the recorder.

To enable such switching operations to be effected, cassette recorders have been devised which operate with specially modified cassettes. The modifications consist of apertures or metal foils on the cassette housing which cooperate with corresponding switching devices on the machine and thus trigger switching operations. The modified-cassette idea has the disadvantage that additional operations become necessary during cassette manufacture. Moreover, these switching arrangements cannot be used for ordinary tape recorders operating with reels.

The switching of the tape-recorder electronics in dependence on the type of tape employed has so far not been found possible without expensive additional markings directly on the tape or on a cassette.

SUMMARY OF THE INVENTION

The present invention has for its object to improve the known methods and arrangements of the type referred to by simple means and to extent their applicability.

Another object of the invention is to develop simple methods and arrangements for switching tape recorders which operate with tape coated with different types of magnetic layer.

The invention provides a method for switching a tape-recorder operating with magnetic tape wound on a reel and simultaneously drawn off the same or another reel, the magnetic tape being attachable to the reel or reels and its surface being scanned to obtain a signal for the switching operation, in that a section along the tape, especially a leader and/or trailer tape is used which consists of a (preferably synthetic) material characterized by an at least partly much higher electric resistance than that of the magnetic coating and in that the resistance of the tape is monitored continuously or sporadically and at least one predetermined switched state is allocated to each different resistance value.

Another object of the invention, previously referred to, is achieved if to each resistance value characteristic of a given magnetic coating is allocated a corresponding switched state of the recorder electronics. This ensures in a simple, advantageous manner that the machine, whether it is a reel-type or cassette recorder, is automatically switched to its optimum operating condition.

The leader or trailer may be a synthetic foil, for example, polyester, polyvinyl chloride, polyurethane foil with an electric resistance in the teraohm region ($10^{12}\Omega$) which virtually acts as insulator. Suitable paper or textile strips are of course also usable. According to DIN 45 512, the electric resistance of the magnetic coating (in the case of $Fe_2O_3$ tapes) should not be higher than ten giga-ohms ($10^{10}\Omega$) and, in the case of magnetic tape used in data technology, should be below 500 megaohms ($5.10^8\Omega$).

In magnetic tape with chromium dioxide or iron powder the resistance of the magnetisable layer is especially low and depends on processing. In chromium dioxide tapes, for example, it is quite easy to obtain coatings having a resistance below one megaohm ($10^6\Omega$), particularly a minimum resistance value of about 50 kiloohms, and in metal pigment tapes coatings having the same resistance value.

According to another advantageous feature of the method of the invention, the resistance of the magnetic coating may be used to switch to the state "machine operates" (the tape drive is enabled) and the resistance of at least one tape section preferably consisting of synthetic material, and especially the resistance of the leader and/or trailer, may be used to switch to the state "machine stops" (the tape drive is disabled or disengaged).

On the basis of the above-quoted values, resistance ratios of at least 100:1 (according to DIN) upon the transition from the leader to the $Fe_2O_3$ tape, and of $10^6:1$ (for $CrO_2$ tape) are obtained which, in terms of voltage ratios, correspond to 40 dB and 120 dB respectively. Relative humidity and/or ambient temperature affect the resistance of the magnetic coating only very slightly. It is therefore possible to achieve a very reliable switching operation, virtually unaffected by other factors.

Other advantages are that the magnetic tape can be used without special modification, i.e. without splicing in an additional switching tape or without the provisions of special control marks in the form of conductive portions on the tape, and that the desired switching operation can be performed and maintained reliably. The method of the invention can be applied to any switching operation on tape recorders on which switching to a different operating condition is desired at the beginning or at the end of the magnetic tape and/or in certain places along the tape. The method of the invention is of particular advantage for the on/off switching of the tape drive and for transducer bias circuit changeover switching in recorders capable of optimum performance with $Fe_2O_3$, $CrO_2$ tapes or other types of tape.

In an advantageous embodiment of apparatus suitable for carrying out the method of the invention, wiper contacts are provided in the circuit of a switching stage which bear at least temporarily on the tape surface. These wiper contacts and the switching stage are the only additional means required in the apparatus. The switching stage may consist of a transistor circuit, for example. This makes the design very simple and inexpensive. Further according to the invention, the switching stage may comprise a time-delay element, preferably an RC-network. This prevents inadvertent switching which may be caused, for example, by resistance variations due to failing contact, e.g. by increased tape.

In a preferred embodiment of the apparatus according to the invention, the recorder electronics consist substantially of a switching stage and a frequency response equalizing stage. In addition, it should contain an oscillator stage for generating the HF currents needed for premagnetization and, possibly, for erasing.

In an advantageous embodiment of the apparatus, wiper contacts are provided which bear at least temporarily on the tape surface and are included in the circuit of a switching stage preferably devised in the form of a Schmitt trigger configuration, this switching stage being used to switch the other stages of the recorder electronics.

In a particularly simple embodiment, the switching stage is composed of transistors, and the employment of a Schmitt trigger circuit arrangement has the advantage of accurate adjustment to the scanned resistance values, notwithstanding a simple configuration.

On tape-recorders operating with reels, the wiper contacts preferably precede the tape drive spindle in the travelling direction of the tape. This ensures properly timed disconnection of the drive mechanism before the tape leaves the supply reel. Furthermore, in cassette tape-recorders the wiper contacts are preferably arranged after the tape drive spindle in the travelling direction of the tape. This has the advantage of automatic disconnection when the tape tears or the rewinding spool seizes, because the tape becomes detached from the contacts in either of these cases, so that the resistance between the contacts becomes infinitely high.

The invention is applicable to ordinary reel-to-reel and cassette recorders with equal advantage.

Further details of the invention will now be described with reference to the annexed drawings which illustrate embodiments of the invention.

BRIEF DESCRIPTION OF THE DRAWINGS

FIG. 1 is a diagrammatic representation of the apparatus combined with a magnetic tape-recorder;

FIG. 2 shows an embodiment of the apparatus for disconnecting the drive mechanism when the end of the tape is reached;

FIG. 3 shows in diagrammatic representation apparatus for recorders that can be switched to $CrO_2$ tape operations;

FIG. 4 shows the arrangement of the wiper contacts on a small cassette;

FIG. 5 shows an embodiment of the wiper contact according to FIG. 4;

THE PREFERRED EMBODIMENTS

Figure 6:
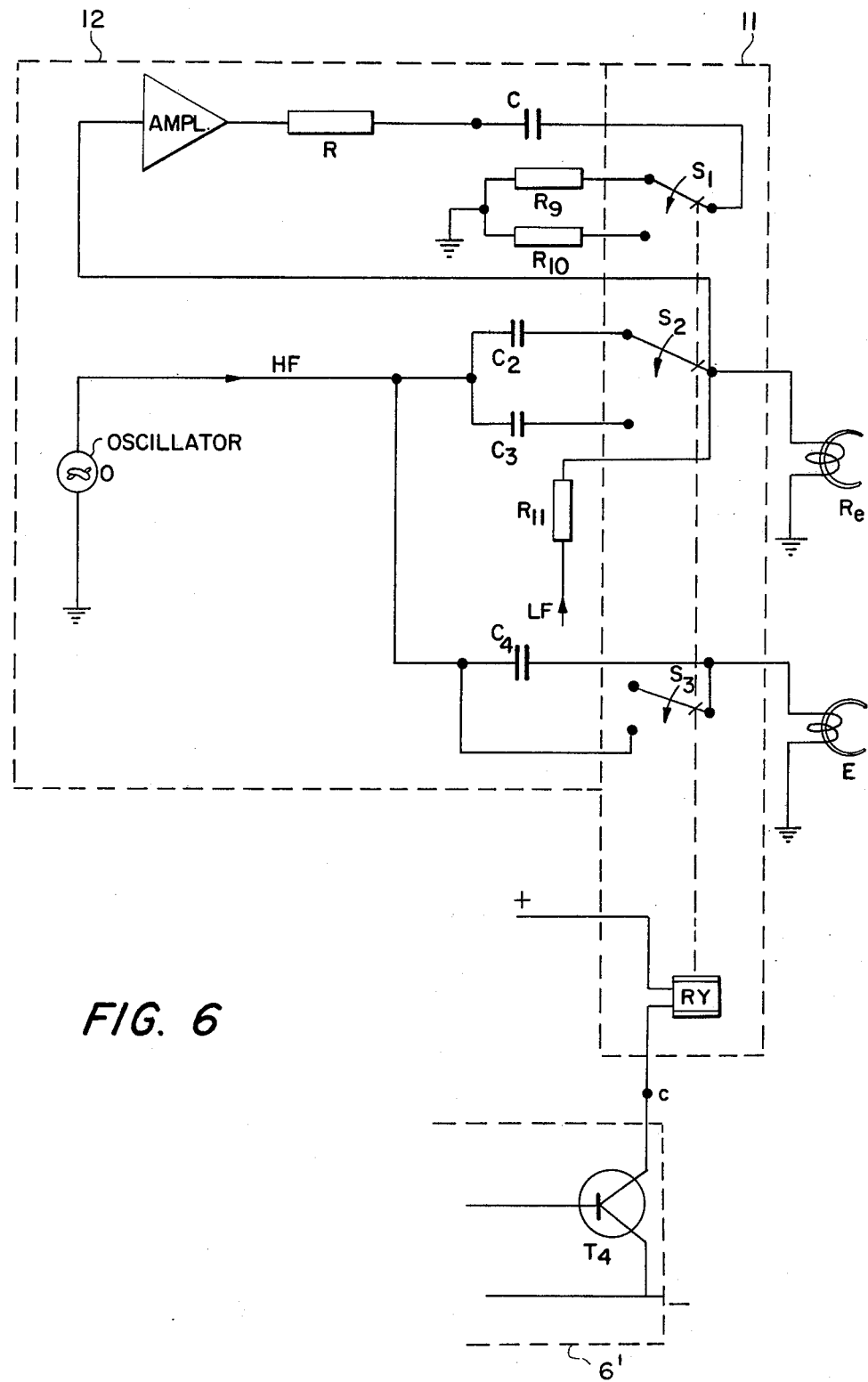
FIG. 6 shows an embodiment of the apparatus for switching to $CrO_2$ tape operations.

A first preferred embodiment of the invention will now be described with reference to FIGS. 1 and 2. A tape recorder 1 having reels or winding cores 2 and 3 operates with magnetic tape 4 provided with leaders and/or trailers of synthetic material by means of which it can be attached to the reels or cores 2 and 3. Contacts K are provided which bear either continuously or sporadically on the surface of magnetic tape 4. Point b on the tape indicates the transition point from coated tape to uncoated trailer. The contacts K are connected with a series circuit comprising an amplifier stage 5 which produces a signal the level of which is determined by the resistance across the contacts, an electronic switching stage 6 responsive to the signal from amplifier 5, and a unit 7 to be switched on and off by stage 6. The electrical resistance of the magnetic tape 4 with its leader and trailer is continuously or sporadically monitored by means of the contacts K. On transition from the magnetic tape coating to the non-magnetic trailer, a high resistance value is measured at the tape end. This produces a change in the output signal from the amplifier 5 which is transmitted to the switching stage 6 where it is utilized as a control signal. Stage 6 then switches off unit 7, which may be, for example, tape transport drive motor M (as shown in FIG. 2). The unit 7 could alternatively represent a solenoid for disengaging the tape drive mechanism in a manner not shown here but well-known in the art or could represent the main power supply to the recorder. Conversely, the lower resistance valve measured upon transition from a non-magnetic leader to the magnetic tape coating is utilized to produce a control signal for turning on unit 7, thus maintaining the tape drive mechanism in operation. The threshold resistance value below or above which it is desired that switching should take place may be set at the amplifier 5.

FIG. 2 shows an embodiment of the circuitry needed for tape-end switch-off. The components of amplifier 5 are enclosed by the dashed lines at the left portion of FIG. 2, while the components of switching stage 6 are enclosed by the dashed lines at the right portion of the Figure. The power supply to the tape transport drive motor M is to be interrupted when a predetermined resistance value appearing across contacts K at the input of amplifying transistor T1 is exceeded. With resistance values within the set point limit transistor T1 conducts and operates the Schmitt trigger (comprising transistors T2 and T3) so that the potential at point a rises and turns on transistor T4 whereby the tape transport drive motor M is maintained in the operating condition. Conversely the base voltage at T1 drops when the resistance between the monitor contacts rises, so that the voltage at a drops due to the Schmitt Trigger T2/T3. To ensure reliable switching of transistor T4, a Zener diode Z1 may be included in its input circuit as shown. It will be apparent to those skilled in the art that the blocking transistor T4 may also be replaced by a relay for the purpose of interrupting power to drive motor M. In order to prevent the tape transport from being stopped by the temporary transgression of the resistance threshold due to contact fluctuations (e.g. creased places in the tape), a time-delay element may be included in the amplifier circuit arrangement. In the embodiment of FIG. 2 this time delay is effected by capacitor C1 in conjunction with resistor R1. The circuit arrangement of FIG. 2 may of course be provided as an integrated circuit.

The contacts may be arranged at any desired point on the tape transport, although it is preferable to place them between the tape drive spindle and the supply reel and as close as possible to the supply reel. In the event of a tape break, the contacts K will lose contact with the tape, causing the transport to stop before a great deal of tape is spilled. On reel-to-reel recorders in normal operation, the trailer will be prevented from running off the reel at the tape end. On cassette-type recorders this configuration will allow for immediate operation of the tape drive when a cassette is turned over and reinserted in the machine. FIG. 1 shows a machine which is at the point of shutoff, with transition point b at contacts K. When the contacts K are near the supply reel, as shown, the cassette machine will restart immediately when the cassette is turned over and reinserted as shown in FIG. 3. The trailer becomes a leader and transition point b is well past contacts K. Tape cassettes referred to herein may be, for example, of the type shown in U.S. Pat. No. 3,601,558. Manually actuable switch S4 is provided for advancing the coated tape portion into initial contact with contacts K.

FIGS. 3 and 6 show another preferred embodiment of the present invention wherein frequency response equalizing stages for recording on different types of magnetic tape are automatically compensated in dependence upon the resistivity of the magnetic tape coating. In FIG. 3 is shown a diagrammatic representation of a tape recorder 10 which, in this case, is capable of optimum performance with magnetic tape having an iron oxide ($Fe_2O_3$) layer as well as with tape having a chromium dioxide ($CrO_2$) coating. The arrangement comprises, in addition to the amplifier 5 and the switching stage 6 described with reference to the foregoing embodiment, switching stages 6' and 11 and an equalizing amplifier stage 12 which accommodates use of either $CrO_2$ or $Fe_2O_3$ tapes. In FIG. 3 amplifier 5 provides a control signal dependent upon the resistance across contacts K to switching stages 6 and 6'. Stage 6 in turn controls unit 7, the tape drive mechanism, as described above. Stage 6' is identical to stage 6 except that its threshold switching level is at a predetermined resistance value (across contacts K) which is intermediate the resistance of $CrO_2$ and $Fe_2O_3$ tape coatings. For example, the threshold resistance value of stage 6' is set to be 10 mega-ohms ($10^7 \Omega$). The resistance of $Fe_2O_3$ tape coating is typically at least one order of magnitude higher than this value ($>10^8 \Omega$) while the resistance of $CrO_2$ tape coatings is at least one order of magnitude lower than this value ($<10^6 \Omega$).

Stage 12 comprises the customery amplifying means and frequency response equalizing stages, as well as an oscillator stage for generating high frequency (HF) currents for premagnetization and/or erasing. Equalizing stage 12 is capable of being switched to provide optimum recording on either $Fe_2O_3$ or $CrO_2$ tape. Switching stage 11 is controlled by stage 6' and in turn sets stage 12 to the proper operating state for the tape being used. Switchover of stage 12 is effected when contacts K measure the resistance value typical for $CrO_2$ coating on the moving tape or when measuring the relatively higher resistance value of $Fe_2O_3$ tape. When no tape coating is touching contacts K, the unit shown will switch to the $Fe_2O_3$ operating mode.

FIG. 6 illustrates a preferred circuit arrangement for stages 11 and 12. Stage 12 includes the customary electronic amplifying means (Ampl.); a frequency response equalizing stage comprising resistors R, R9 and R10 and a capacitor C; and oscillator means O including capacitors C2 and C3 and resistor R11 for generating the HF current for premagnetization, and capacitor C4 for erasing. Depending upon the position of switch S1, one of the resistances R9, R10 together with capacitance C will determine the delay time T required for the tape being used. The delay time $T_{4.75Fe} = 120$ secs for $Fe_2O_3$ tapes and $T_{4.75CrO_2} = 70$ secs for $CrO_2$ tapes are well known in the art and are standardized by the Deutsche Industrie Norm DIN 45,513. The reason for standardization of these different types of magnetic tapes is the desirability of ensuring compatibility, allowing optimal recording and playback on any recorder. When switch S1 contacts R10, $CrO_2$ tapes can be optimally recorded or played and when S1 contacts R9, $Fe_2O_3$ tapes can be optimally used. HF oscillator O produces the proper current for the necessary premagnetization of the tape being used. Capacitor C2 provides the correct current level for $Fe_2O_3$ tape while capacitor C3 provides the proper level for $CrO_2$ tape. The low frequency (LF) signal to be recorded on tape is fed through input resistor R11 to the record head Re. A portion of the HF current in branched to an erasure head E. Switch S3 ensures that a suitable erasure current level is available for head E, depending upon the type of tape used.

Stage 11 comprises in this preferred embodiment a 3 contact relay including switches S1-S3. All three of the switches are simultaneously actuated upon detection of a suitable tape coating resistance level across contacts K which causes transistor T4 to conduct. For simplicity, only a portion of stage 6' is shown in FIG. 6. It is to be understood however, that stage 6' is of the same general construction as stage 6. The arrangement shown in FIG. 3 is very well suited for conventional audio tape recorders as well as cassette recorders. All the embodiments and details described herein are of course also usable for video, instrumentation and data tape-recorders.

The magnetic tape is shown only diagrammatically in FIGS. 1 and 3. It is to be understood that normally the tape will be provided with a leader and a trailer of a suitable synthetic material well-known in the art. Not only can the difference in resistance values between leader/trailer material and magnetically coated tape be used for switching purposes, but also coated and non-coated tape portions alternating with one another. Such uncoated tape portions may be produced in a simple manner by washing out the magnetic coating of a tape in certain regions. By use of appropriate logic circuitry, switching to another stage or mode of operation may be effected upon detection of several resistance value alternations. It would also be feasible to vary the conductivity of the magnetic coating at certain spots or in certain sections, for example by increasing or reducing the amount of conductive pigment, thus providing for certain resistance values allocated to different tape sections.

FIG. 4 is a part view of a compact cassette 13 with apertures 14 and 15 for the magnetic heads and the capstan idlers and, between these apertures, an opening 16, separated from the apertures by solid portions. Through this opening 16, a contact head 17 is brought close to the magnetic tape 18 while the cassette 13 is used on a cassette recorder. As FIG. 5 shows, the contact head 17 consists of contact wires 19 and 20 embedded in a block of insulating material 21 and may approach the tape also through another opening of the cassette 13. On the take-off side as well as on the tape-up side or at both these points contact heads 17 may bear on the tape either continuously or temporarily, according to whether a change-over to a $CrO_2$ tape, tape end switching or both operations are desired.

Since magnetic tape, especially with high relative humidity, is not always chemically neutral, so that corrosion may take place, it is advisable to employ contacts K and/or contact wires 19 and 20 of abrasion-resistance and corrosion-proof metal such as copper, nickel, silver or abrasion-resistant alloys, e.g. bronze.

Special cassette recorders, featuring a contact head 17 and an arrangement according to FIG. 2, were tested in continuous-duty operation over two weeks with tapes having a coating resistance of approximately 1 G-ohm: no switching failures or inaccurate switching operations were observed.

The methods of the invention and the apparatus for carrying out this method are not confined to special tape-recorders, magnetic tapes of their fields of application. Control signals triggered according to the method of the invention may be used for the most varied switching purposes conceivable. Other practical embodiments of the apparatus are conceivable within the scope of the methods of this invention for which protection is likewise applied for within the limits of the following claims.

The term "operating state" means any condition or mode of operation to which the assembly may be switched; such states include, but are not limited to engagement or disengagement of the tape drive mechanism, tape drive motor power "on" or power "off", and tape head biasing circuitry in $Fe_2O_3$ mode or $CrO_2$ mode.

We claim:

1. Apparatus for controlling the operating of a magnetic tape transport device, the device having a magnetic signal transducer and an electronic equalizing circuit capable of being switched to a first operating state for providing a first bias to said transducer for use with tapes having a first magnetic coating resistance value and a first coercivity, and to a second operating state for providing a second bias to said transducer for use with tapes having a second magnetic coating resistance value and a second coercivity, comprising:

means for detecting the resistance value between two adjacent points on the tape and for switching said circuit, said means having a threshold level corresponding to a predetermined resistance value in between said first and second resistance values, whereby said means switches said circuit to said first operating state when the detected resistance value is below said threshold level and to said second operating state when the detected resistance value is above said threshold level.

2. The apparatus of claim 1, wherein said predetermined resistance value is $10^7$ ohms when said tapes having first and second coating resistance values have $CrO_2$ and $Fe_2O_3$ coatings, respectively.

3. The apparatus of claim 1, wherein said means comprises wiper contacts biased against said magnetic tape.

4. The apparatus of claim 1, further comprising means for delaying for a predetermined time period the switching from one of said states to the other of said states.

5. The apparatus of claim 1, wherein said electronic equalizing circuit includes a frequency response equalizing stage and means for generating high frequency tape magnetization currents.

6. A method of controlling the operation of a magnetic tape transport device, the device having a magnetic signal transducer and an electronic equalizing circuit capable of being switched to a first operating state for providing a first bias to said transducer for use with tapes having a first magnetic coating resistance value and a first coercivity and to a second operating state for providing a second bias to said transducer for use with tapes having a second magnetic coating resistance value and a second coercivity, comprising the steps of:

detecting the resistance value between two adjacent points on the tape, and switching said circuit to said first operating state when the detected resistance value is below a threshold level corresponding to a predetermined resistance value in between said first and second resistance values and switching said circuit to said second operating state when the detected resistance value is above said threshold level.

7. The method of claim 6, wherein the step of detecting the tape surface resistance value includes the step of biasing wiper contacts against the coating of the magnetic tape.

8. The method of claim 6, further comprising the step of delaying for a predetermined time period the switching from one of said states to the other of said states.

* * * * *